UNITED STATES PATENT OFFICE.

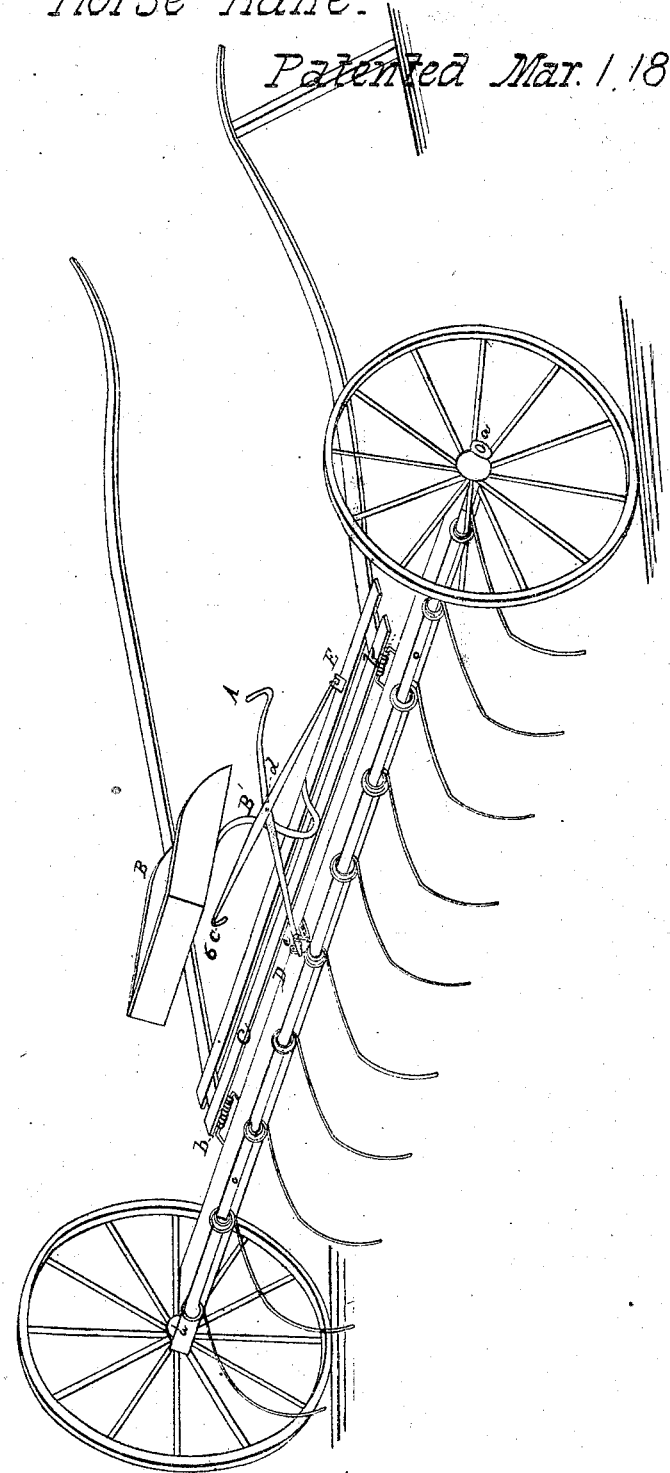

WM. H. WHITE, OF GARRATSTVILLE, NEW YORK.

IMPROVEMENT IN HORSE-RAKES.

Specification forming part of Letters Patent No. 23,133, dated March 1, 1859.

*To all whom it may concern:*

Be it known that I, WM. H. WHITE, of Garrattsville, in the county of Otsego and State of New York, have invented a new and useful Improvement in Horse-Rakes; and I do hereby declare that the following is a full, clear, and exact description of the same, reference being had to the accompanying drawing, forming a part of this specification.

The drawing exhibits a perspective view of my invention applied to a rake.

The nature of my invention consists simply in the employment of two levers, which are crossed diagonally and pivoted together, in combination with the turning rake, and with the frame and seat of the carriage, when one of the levers is arranged to be depressed by the weight of the driver on the seat of the carriage, and thus made to serve for holding the rake down to the ground, and the other arranged to be operated by hand, and to serve for throwing up the rake and thus freeing it of its load. The advantage of this arrangement lies in its great simplicity and in the effective manner in which it performs the operations above named.

To enable others skilled in the art to make and use my invention, I will proceed to describe its construction and operation.

D represents the rake-head. It serves as the axle for the propelling-wheels, being furnished with short round journals *a* at its ends, on which the wheels revolve, and on which the rake-head turns when it is desired to discharge the teeth of the substance which has collected on them. This rake-head is hinged at *b b* to the frame *c* of the carriage, so that its teeth may be turned up for the purpose just stated.

B represents the driver's seat. It is arranged on a spring, B', so that it may descend with the application of the driver's weight and ascend when his weight is withdrawn.

A C represent two levers crossed diagonally and connected by a pivot at *d*, said pivot serving as the fulcrum for said levers to turn upon. The lever A is hinged at *e* to the rake-head and extends forward below the driver's seat, so as to be conveniently operated by hand or foot. By forcing it forward the rake-head will be turned and its teeth thrown up so as to effect the discharge of whatever may have collected on them. The lever C is connected at E to the frame of the carriage and extends back below the driver's seat, so that it, when the seat is depressed by the weight of the driver, shall be depressed, and thus caused to exert a force upon the pivot *d*, and through said pivot cause the lever A to hold the rake-head firmly down to the ground. It will be seen that the lever C, while it serves as a means whereby to transmit the weight of the driver to the lever A, and therefrom to the rake-head, serves as the support for the fulcrum *d* of the lever A.

It may be common, although I am not at present aware that such is the fact, to construct a rake so as to be held down to the ground by the driver's weight, and to be capable of being thrown up when it is desired to free its teeth of whatever may have collected on them. However, this matters not, as I simply desire to use the arrangement herein specified, it being the very thing needed and the very perfection of simplicity.

What I claim as my invention, and desire to secure by Letters Patent, is—

The employment of the two levers A C, when crossed diagonally and pivoted together at *d*, in combination with the turning rake-head D, frame *c*, and seat B B', substantially as and for the purposes set forth.

WM. H. WHITE.

Witnesses:
 HOMER ANDERSON,
 A. G. NEARING.